United States Patent [19]

Kerner

[11] Patent Number: 5,449,197
[45] Date of Patent: Sep. 12, 1995

[54] AIR BAG COVER SEWN TO UNDERLYING MEMBRANE SWITCH

[75] Inventor: Wolfgang Kerner, Rottenburg, Germany

[73] Assignee: Mercedes-Benz AG, Stuttgart, Germany

[21] Appl. No.: 114,632

[22] Filed: Sep. 2, 1993

[30] Foreign Application Priority Data

Sep. 4, 1992 [DE] Germany .......................... 42 29 562.9

[51] Int. Cl.⁶ .............................................. B60R 21/16
[52] U.S. Cl. ................................... 280/731; 280/750; 280/728.3
[58] Field of Search ................... 280/731, 750, 728 R, 280/728 B, 743 R; 200/512

[56] References Cited

U.S. PATENT DOCUMENTS

| | | | |
|---|---|---|---|
| 4,991,869 | 2/1991 | Hopf et al. | 280/725 B |
| 5,002,306 | 3/1991 | Hiramitsu et al. | 280/731 |
| 5,186,490 | 2/1993 | Adams et al. | 280/731 |
| 5,198,629 | 3/1993 | Hayashi et al. | 280/731 |
| 5,265,904 | 11/1993 | Shelton et al. | 280/731 |
| 5,269,559 | 12/1993 | Filion et al. | 283/728 |

FOREIGN PATENT DOCUMENTS

| | | |
|---|---|---|
| 4034539 | 5/1991 | Germany . |
| 4034539A1 | 5/1991 | Germany . |
| 4035975A1 | 5/1992 | Germany . |
| 2252274 | 5/1992 | United Kingdom . |

*Primary Examiner*—Margaret A. Focarino
*Assistant Examiner*—Christopher Ellis
*Attorney, Agent, or Firm*—Evenson McKeown Edwards & Lenahan

[57] ABSTRACT

A cover arrangement is disclosed for an air bag which is arranged in a motor vehicle and is automatically inflated to form an impact cushion for an occupant in the event of an accident. The cover arrangement includes a covering protecting the air bag being torn open at intended tearing lines. Provision is made for the covering to be constructed as a support of a membrane switch arrangement which, for its safety during inflation of the air bag and during the tearing open of the covering thus caused, is connected to a cladding of the covering made of leather or similar material so as to be resistant to tearing.

11 Claims, 2 Drawing Sheets

AIR BAG COVER SEWN TO UNDERLYING MEMBRANE SWITCH

BACKGROUND AND SUMMARY OF THE INVENTION

The invention relates to a covering for an air bag which is folded and accommodated in a receiving compartment of a motor vehicle which can be closed by the covering. The airbag is automatically inflated to form an impact cushion for an occupant in the event of an accident involving the motor vehicle, the covering tearing open at given intended tearing lines. A special cladding is provided for the covering which consists of tear-resistant material, such as in particular leather, and is slotted at intended tearing lines which may be covered by it.

Very many motor vehicles are already equipped with occupant restraint systems as standard features, in which air bags which protect the driver and passenger are automatically inflated in the event of an accident. Systems of this type have proved to be expedient in practice.

When not in use, each air bag is accommodated in a folded state in a receiving compartment which can be formed on the driver's side, for example by a box arranged as the hub of the steering wheel. On the passenger side, an appropriate recess, for example in the form of a housing, is usually provided in the dashboard or instrument panel. These accommodation compartments are normally closed on the exit side of the respective air bag by a covering which is usually of cushion-like construction, is provided with intended tearing points or lines and can accordingly be torn open relatively easily by the air bag which is inflated in the event of an accident.

For reasons of tastefulness, the covering has on its side facing the occupant a cladding which can consist of leather, for example according to German Patent Document DE-A 4,035,975 and British Patent Document GB-A 2,252,274.

Since leather and similar materials are very resistant to tearing, if this material passes over intended tearing points or lines of the covering, it must be interrupted at such sites by slots.

According to German Patent Document DE-A 4,035,975, the edges of the pieces of leather next to the slots can form seams which are folded inwards, it being possible for the seamed edges of the pieces of leather to be connected to one another invisibly to the greatest extent by an easily tearable web of paper or the like which is covered to the greatest extent by the seamed edges of the pieces of leather.

Provision is made according to British Patent Document GB-A 2,252,274 for the covering to have narrow slots at the intended tearing points or lines, by means of which slots the edges of the pieces of leather are held.

Leather claddings of this type may indeed be preferred by the purchasers of the motor vehicles for reasons of tastefulness, but they have the basic disadvantage of a relatively high price since the manufacture and mounting are comparatively expensive.

It is known from German Patent Document DE-A 4,034,539 and U.S. Pat. No. 5,002,306 to integrate membrane switches in the covering of an air bag or to arrange them on the surface of the covering in order to be able to utilize the surface of this covering, which is relatively easily accessible and comparatively large, for controls of the motor vehicle. However, the arrangement of membrane switches on the covering is not exactly unproblematic because the covering is burst open in the manner of an explosion during inflation of the air bag, in which case the membrane switches can become detached from the covering and injure occupants of the vehicle.

An object of the invention is now to provide a cladding made of leather or comparable material, which is particularly attractive in terms of tastefulness, for the covering of an air bag with comparatively low expense.

According to the invention, this object is achieved in that the covering is constructed as a support of a membrane switch arrangement which, for its safety during inflation of the air bag and during the tearing open of the covering thus caused, is connected to the cladding by sewing so as to be resistant to tearing.

According to the invention, the cladding of the covering of the air bag thus has a dual function, in that, on the one hand, it serves for the tasteful design of the covering due to the corresponding material, such as for example leather, and, on the other hand, takes over the task of securing the membrane switch arrangement. In this case, the high resistance to tearing of leather and similar material is particularly advantageous. Additionally, the connection of the cladding or of the leather to the membrane switch arrangement by sewing can be carried out relatively easily during production because these are production methods which are in any case customary in the manufacture of the cladding.

Other objects, advantages and novel features of the present invention will become apparent from the following detailed description of the invention when considered in conjunction with the accompanying drawings.

DETAILED DESCRIPTION OF THE DRAWINGS

A housing, which serves for receiving an air bag (not illustrated), is likewise not illustrated and has an open side for the exit of the air bag during inflation, is closed on this side by a covering 1 made of cushion-like foamed material. In the case illustrated, this covering has intended tearing lines 2 which are arranged in an H-shape and at which the covering 1 tears open during inflation of the air bag so that the air bag can emerge from its housing virtually free from restraint through the covering 1 and can form a gas-filled impact cushion.

Figure 1:
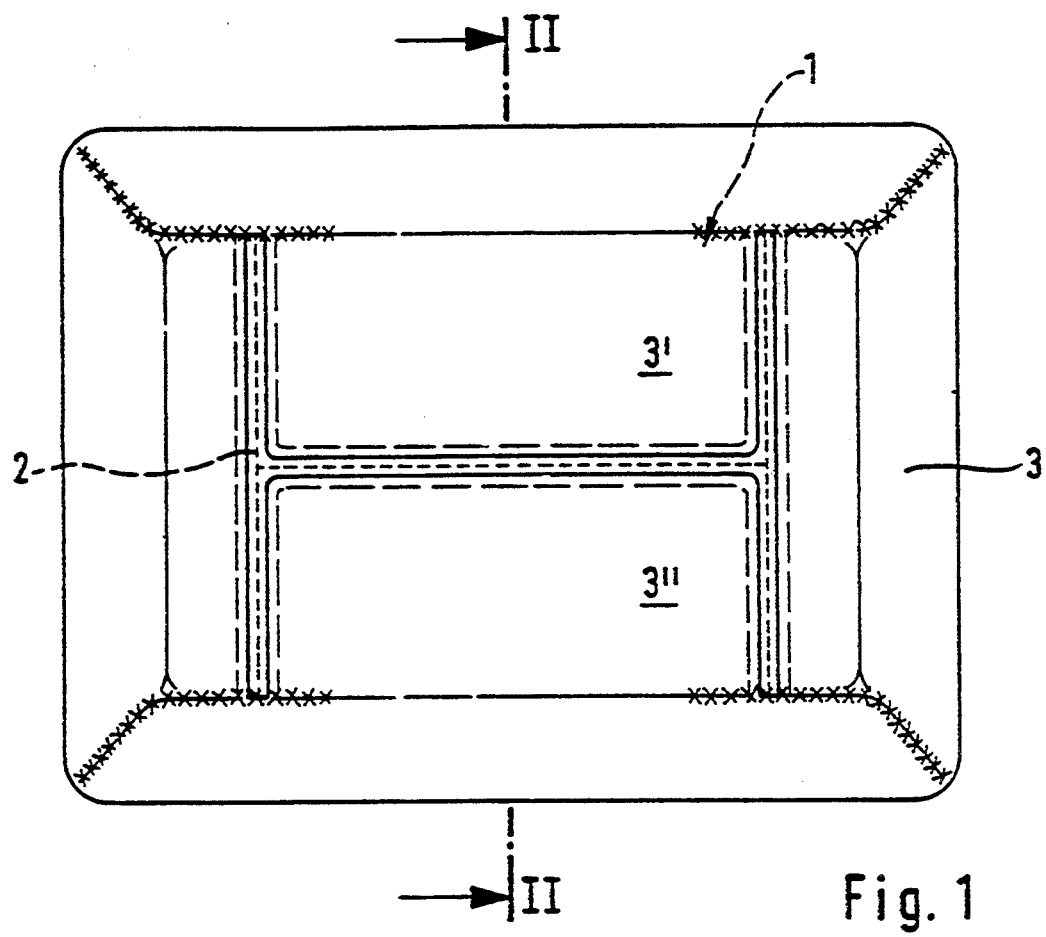
FIG. 1 shows a plan view of a covering constructed according to a preferred embodiment of the invention.
Figure 2:
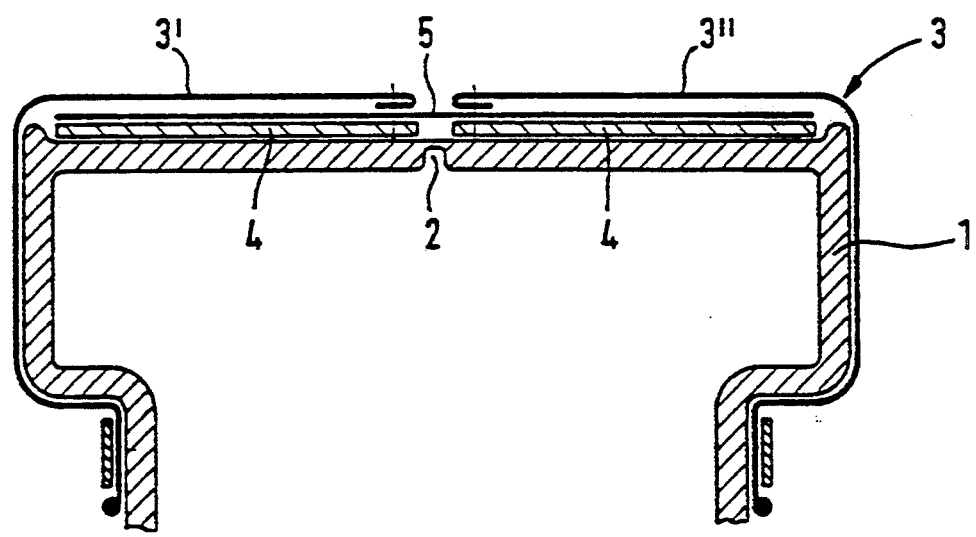
FIG. 2 shows a sectional diagram corresponding to the section line II—II in FIG. 1.

The outside of the covering 1 is surrounded by a leather cladding 3 which is fastened at its lower edge in FIG. 2 together with the covering 1 by means of a strap to stationary or load-bearing parts of the vehicle or to the outside of the housing which receives the folded air bag.

In the region of the intended tearing lines 2, the leather cladding is slotted.

The leather cladding 3 usually consists of a plurality of pieces of leather which are sewn together and are then bounded in the region of the slots at the intended tearing lines 2 by seams which are folded inwards.

Arranged on the covering 1 below the parts 3' and 3" of the leather cladding 3 are membrane switches 4 which are covered by the leather cladding 3 and are sewn at the edges to the parts 3' and 3" of the leather cladding 3 or connected in another manner so as to be resistant to tearing. The membrane switches 4 can serve, for example, for actuating a horn or the like of the motor vehicle.

In order to guarantee that the parts 3' and 3" of the leather cladding 3 normally rest firmly on the covering 1 together with the membrane switches 4, a relatively easily tearable layer 5, for example in the form of a film or a non-woven, which runs continuously in one piece in the region of the slots of the leather cladding 3, is arranged between the parts 3' and 3" of the leather cladding 3 on the one hand and the membrane switches 4 on the other hand, and is sewn in each case to the leather cladding 3 on both sides of the slots thereof.

Figure 3:
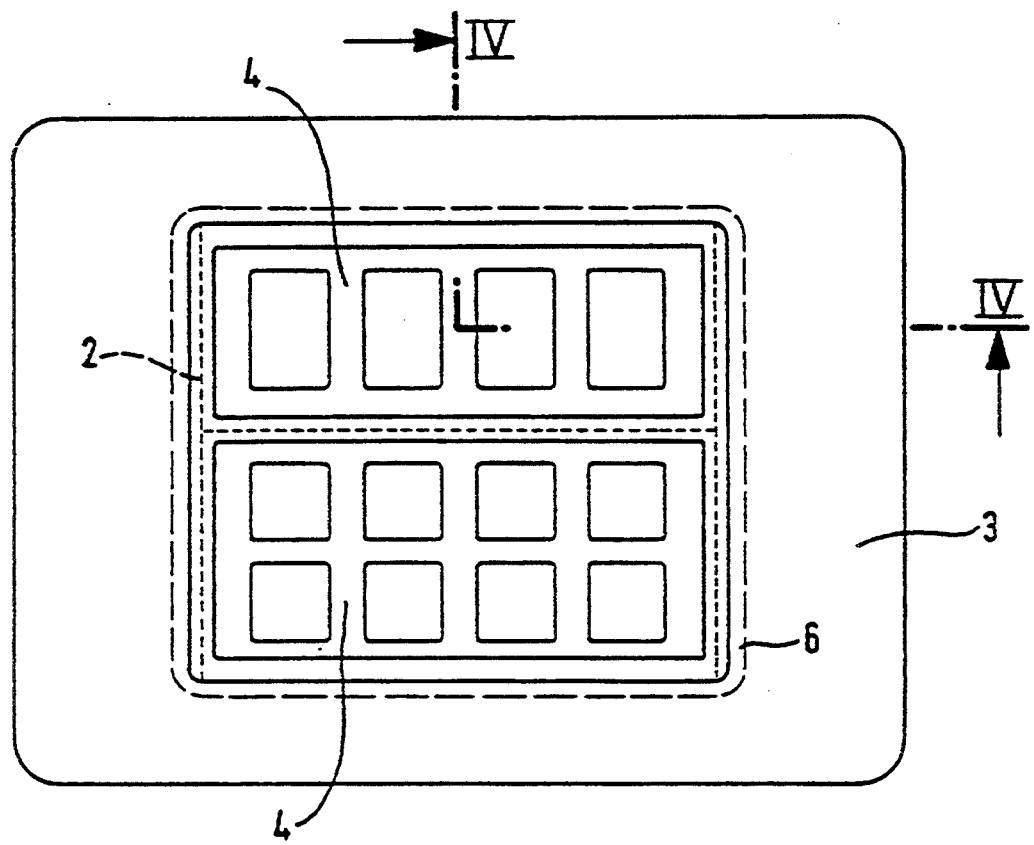
FIG. 3 shows a plan view of a modified embodiment of the covering.
Figure 4:
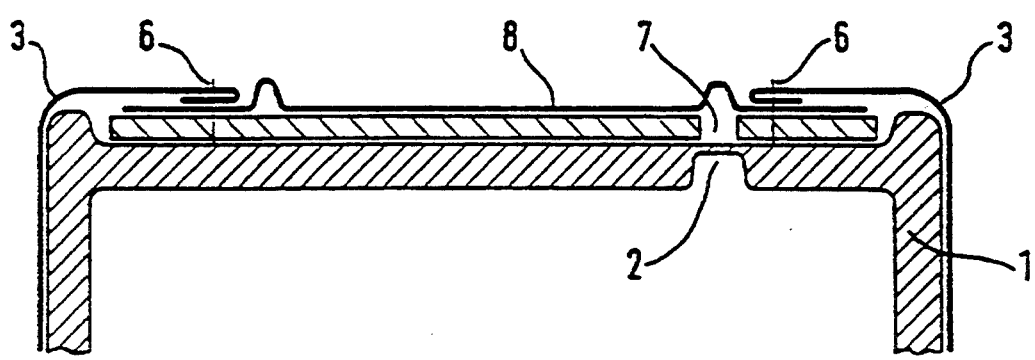
FIG. 4 shows a sectional diagram corresponding to the section line IV—IV in FIG. 3.

The exemplary embodiment illustrated in FIGS. 3 and 4 differs from the embodiment described above, above all in the fact that the membrane switches 4 each form a switching area for controlling many functions and are arranged visibly.

The membrane structure of the membrane switches 4 is sewn to the leather cladding 3 at a peripheral seam 6 outside the intended tearing lines 2. In the region of the intended tearing lines 2, the membrane structure has slots 7 which are covered by a relatively easily tearable film layer 8 which covers the entire membrane structure of the membrane switches 4 and is likewise fixed by the peripheral seam 6. This prevents occupants from reaching into the slots 7 with their fingernails and prevents manipulation on the intended tearing lines 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cover arrangement for an airbag which is folded and accommodated in a receiving compartment of a motor vehicle, comprising:
    a covering disposed to cover an automatically inflatable airbag disposed in the receiving compartment, said covering having predetermined tear lines along which the covering tears open in the event of inflation of the airbag;
    a decorative cladding of tear-resistant material disposed on a vehicle occupant side of the covering, said cladding being slotted adjacent the tear lines of the covering when in an in use storage position of the airbag and covering; and
    a membrane switch which is actuable by a vehicle occupant to operate a vehicle horn;
    wherein the covering is constructed as a support for the membrane switch;
    wherein the membrane switch is connected to the cladding by sewing so as to be tear resistant to thereby protect the safety of vehicle passengers by securing the membrane switch against detachment from the cladding during inflation of the airbag and tearing open of the covering; and
    wherein a relatively easily tearable film layer, which covers the intended tear lines in one piece, is arranged over the membrane switch arrangement.

2. Cover arrangement for an airbag which is folded and accommodated in a receiving compartment of a motor vehicle, comprising:
    a covering disposed to cover an automatically inflatable airbag disposed in the receiving compartment, said covering having predetermined tear lines along which the covering tears open in the event of inflation of the airbag;
    a decorative cladding of tear-resistant material disposed on a vehicle occupant side of the covering, said cladding being slotted adjacent the tear lines of the covering when in an in use storage position of the airbag and covering; and
    a membrane switch which is actuable by a vehicle occupant to operate a vehicle horn;
    wherein the covering is constructed as a support for the membrane switch;
    wherein the membrane switch is connected to the cladding by sewing so as to be tear resistant to thereby protect the safety of vehicle passengers by securing the membrane switch against detachment from the cladding during inflation of the airbag and tearing open of the covering;
    wherein the cladding is cut away in the region of actuating areas of the membrane switch arrangement; and
    wherein a relatively easily tearable film layer, which covers the intended tear lines in one piece, is arranged over the membrane switch arrangement.

3. Cover arrangement according to claim 1, wherein the membrane switch includes membrane switch units arranged on both sides of one of the intended tear lines.

4. Cover arrangement according to claim 1, wherein the membrane switch is arranged so as to be concealed by the cladding.

5. Cover arrangement according to claim 3, wherein the membrane switch is arranged so as to be concealed by the cladding.

6. Cover arrangement according to claim 3, wherein the cladding is cut away in the region of actuating areas of the membrane switch arrangement.

7. Cover arrangement according to claim 1, wherein the membrane switch has a weakened structure, in particular slots, in the region of the intended tear lines.

8. Cover arrangement according to claim 4, wherein the membrane switch has a weakened structure, in particular slots, in the region of the intended tear lines.

9. Cover arrangement according to claim 1, wherein the tear resistant material is leather.

10. Cover arrangement according to claim 3, wherein the tear resistant material is leather.

11. Cover arrangement according to claim 2, wherein the tear resistant material is leather.

* * * * *